United States Patent
Muramatsu

(10) Patent No.: US 9,185,295 B2
(45) Date of Patent: Nov. 10, 2015

(54) IMAGING APPARATUS AND ELECTRONIC DEVICE

(75) Inventor: Koichi Muramatsu, Yokohama (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/240,274

(22) PCT Filed: Jul. 23, 2012

(86) PCT No.: PCT/JP2012/069265
§ 371 (c)(1),
(2), (4) Date: Feb. 21, 2014

(87) PCT Pub. No.: WO2013/031454
PCT Pub. Date: Mar. 7, 2013

(65) Prior Publication Data
US 2014/0218551 A1  Aug. 7, 2014

(30) Foreign Application Priority Data

Aug. 30, 2011 (JP) .................... 2011-186945

(51) Int. Cl.
*H04N 5/228* (2006.01)
*H04N 5/232* (2006.01)
(Continued)

(52) U.S. Cl.
CPC ............... *H04N 5/23264* (2013.01); *G03B 5/02* (2013.01); *H04N 5/2253* (2013.01); *H04N 5/23287* (2013.01); *G03B 2205/0015* (2013.01); *G03B 2205/0069* (2013.01)

(58) Field of Classification Search
CPC .......... H04N 5/23248; H04N 5/23251; H04N 5/23254; H04N 5/23258; H04N 5/23264
USPC ........... 348/208.2, 208.6, 208.13, 373, 208.5, 348/208.7; 396/55
See application file for complete search history.

(56) References Cited

U.S. PATENT DOCUMENTS

2005/0195287 A1* 9/2005 Uenaka ..................... 348/208.99
2005/0204640 A1* 9/2005 Seo ...................................... 52/7
(Continued)

FOREIGN PATENT DOCUMENTS

| EP | 1833242 A2 | 9/2007 |
|---|---|---|
| JP | 2007-114485 | 5/2007 |

(Continued)

OTHER PUBLICATIONS

The Extended European Search Report issued Jul. 31, 2014, in Application No. / Patent No. 12827905.6-1902 / 2729842 PCT/JP2012069265.

(Continued)

*Primary Examiner* — Sinh Tran
*Assistant Examiner* — Xi Wang
(74) *Attorney, Agent, or Firm* — Oblon, McClelland, Maier & Neustadt, L.L.P.

(57) ABSTRACT

An imaging apparatus includes: a base; an image sensor; and a correction mechanism that prevents an image blur, the correction mechanism including: a movable frame that holds the image sensor; a device for moving in an X-direction; a device for moving in a Y-direction; and an attracting and holding device including: an iron plate provided on one of the movable frame and the base; a magnet plate provided on the other one; and an iron ball provided between the iron plate and the magnet plate, the attracting and holding device attracting and holding the movable frame to the base by attracting the iron plate to the magnet plate via the iron ball, and wherein a guide device moves the movable frame to a side of the base when the movable frame is moved by the devices for moving in the X- and Y-directions in a predetermined direction.

9 Claims, 11 Drawing Sheets

(51) Int. Cl.
*H04N 5/225* (2006.01)
*G03B 5/02* (2006.01)

(56) References Cited

U.S. PATENT DOCUMENTS

| 2007/0058076 | A1* | 3/2007 | Seo ............................... 348/373 |
| 2007/0154195 | A1 | 7/2007 | Irisawa et al. |
| 2008/0151063 | A1* | 6/2008 | Mogamiya ................. 348/208.2 |
| 2009/0189987 | A1 | 7/2009 | Muramatsu et al. |
| 2010/0013939 | A1 | 1/2010 | Ohno et al. |
| 2011/0129206 | A1 | 6/2011 | Muramatsu |
| 2012/0038784 | A1 | 2/2012 | Irisawa et al. |

FOREIGN PATENT DOCUMENTS

| JP | 2007-114486 | 5/2007 |
| JP | 2007-274666 | 10/2007 |
| JP | 2008-187699 | 8/2008 |
| JP | 2009-5323 | 1/2009 |
| JP | 2009-170765 | 7/2009 |
| JP | 2009-204629 | 9/2009 |
| JP | 2010-197612 | 9/2010 |
| JP | 2010-231168 | 10/2010 |
| JP | 2011-112948 | 6/2011 |
| JP | 2011-128415 | 6/2011 |
| JP | 2011-239020 | 11/2011 |
| JP | 2012-22204 | 2/2012 |
| JP | 2012-60559 | 3/2012 |
| JP | 2012-242768 | 12/2012 |
| JP | 2013-50500 | 3/2013 |
| WO | WO 2010/101260 A1 | 9/2010 |
| WO | WO2012/161343 A1 | 11/2012 |
| WO | WO2013/031454 A1 | 3/2013 |

OTHER PUBLICATIONS

International Search Report issued on Oct. 30, 2012 in PCT/JP2012/069265 filed on Jul. 23, 2012.

* cited by examiner

IMAGING APPARATUS AND ELECTRONIC DEVICE

TECHNICAL FIELD

The present invention relates to an imaging apparatus having a correction mechanism that corrects an image blur due to camera shake, and an electronic device having the imaging apparatus.

BACKGROUND ART

Conventionally, a correction mechanism mounted in a digital still camera that performs an image blur correction is known (see Japanese Patent Application Publication number 2010-231168).

The correction mechanism has a movable frame that holds an image sensor and is mounted in a base of a camera body so as to be movable to the right and left (in an X-direction), and up and down (in a Y-direction), X and Y coils that are provided in the movable frame in order to move the movable frame in the X- and Y-directions, and so on.

The movable frame is attracted to the base by magnetism, and is movable in the X- and Y-directions so as not to shift in an optical axis (a Z-axis) direction due to camera shake, that is, so as not to separate from the base.

In the movable frame, a magnetic plate is provided. In a position on the base facing the magnetic plate, a ball-receiving plate of a non-magnetic body is provided. On a reverse surface of the ball-receiving plate, a magnet is mounted, and an iron ball is provided between the ball-receiving plate and the magnetic plate. The magnetic plate is attracted to the magnet via the ball-receiving plate and the iron ball, thereby attracting and holding the movable frame to the base, and the movable frame is moved by the iron ball in the X- and Y-directions.

When increasing the magnetism of the magnet and increasing an attracting force, movements in the X- and Y-directions of the movable frame are not performed smoothly, a camera shake correction operation is interrupted, and therefore the attracting force of the magnet is set to small.

SUMMARY OF THE INVENTION

Because of the above, when receiving an impact due to dropping and so on, there is a case where the movable frame separates from the iron ball (magnetic spherical body), and is not attracted and held to the base.

Accordingly, a locking lever for a center position correction, and a motor that drives the lever are provided to attract and hold the movable frame separated from the iron ball to the base.

An object of the present invention is to provide an imaging apparatus having a correction mechanism that attracts and holds the movable frame separated from the magnetic spherical body to the base, and an electronic device having the imaging apparatus, without providing the locking lever for the center position correction and the motor.

In order to achieve the object, an embodiment of the present invention provides an imaging apparatus comprising: a base that is provided in a body case in which a shooting optical system is mounted; an image sensor that receives an image of a photographic subject formed by the shooting optical system; and a correction mechanism that prevents an image blur due to movement of the image of the photographic subject by following the image sensor in an X-Y plane perpendicular to an optical axis of the shooting optical system taken as a Z-axis, in accordance with the movement of the image of the photographic subject on the image sensor due to camera shake occurring in the camera body, the correction mechanism having: a movable frame that holds the image sensor and is arranged on a front side of the base; three attracting and holding devices that attract and hold the movable frame movably in the X-Y plane, and are arranged at three positions so as to form a triangle; a device for moving in an X-direction that moves the movable frame in the X-direction; and a device for moving in a Y-direction that moves the movable frame in the Y-direction, each of the three attracting and holding devices having: a metal plate having magnetism that is provided in one of the base and the movable frame; a magnet plate that is provided in the other of the base and the movable frame; and a magnetic spherical body that is provided between the metal plate having magnetism and the magnet plate; the attracting and holding device attracting and holding the movable frame to the base by attracting the metal plate having magnetism to the magnet plate via the magnetic spherical body, wherein a guide device, in a case where at least one metal plate having magnetism of the three attracting and holding devices separates from the magnetic spherical body, when the movable frame is moved in a predetermined direction by one of the devices for moving in the X- and Y-directions, that moves the movable frame to a side of the base along with the movement of the movable frame, and thereby the metal plate having magnetism separated from the magnetic spherical body is attracted to the magnetic spherical body is provided in the triangle.

BRIEF DESCRIPTION OF THE DRAWINGS

Each of FIGS. 1A to 1C is an external view of a digital still camera according to an embodiment of the present invention.

DESCRIPTION OF EMBODIMENTS

Hereinafter, a digital still camera as an example of an electronic device in which an imaging apparatus according to an embodiment of the present invention is mounted will be explained with reference to the drawings.

[First Embodiment]

Figure 1A:
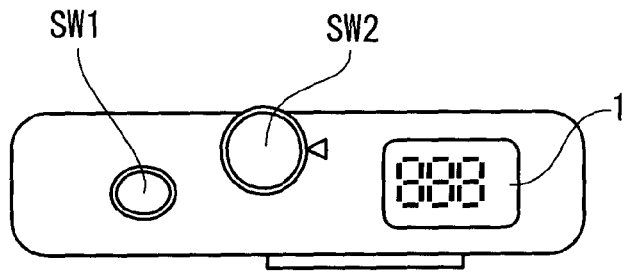
FIGS. 1A to 1C are a top view, a front view, and a rear view, respectively.
Figure 1B:
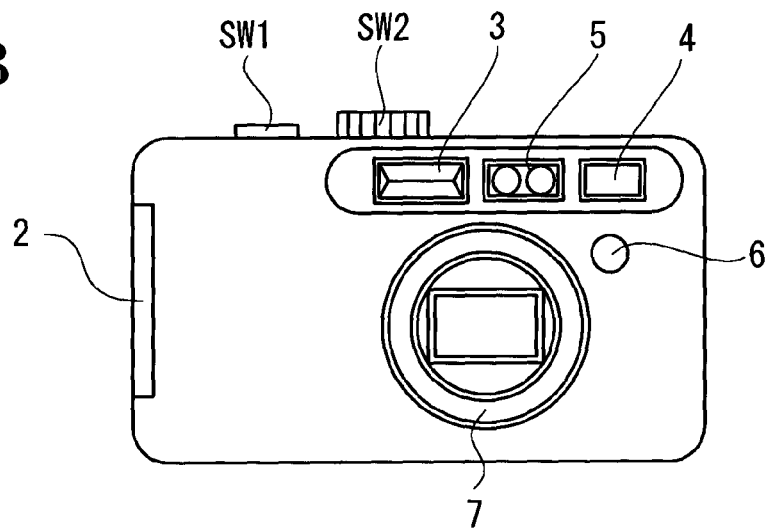
Figure 1C:
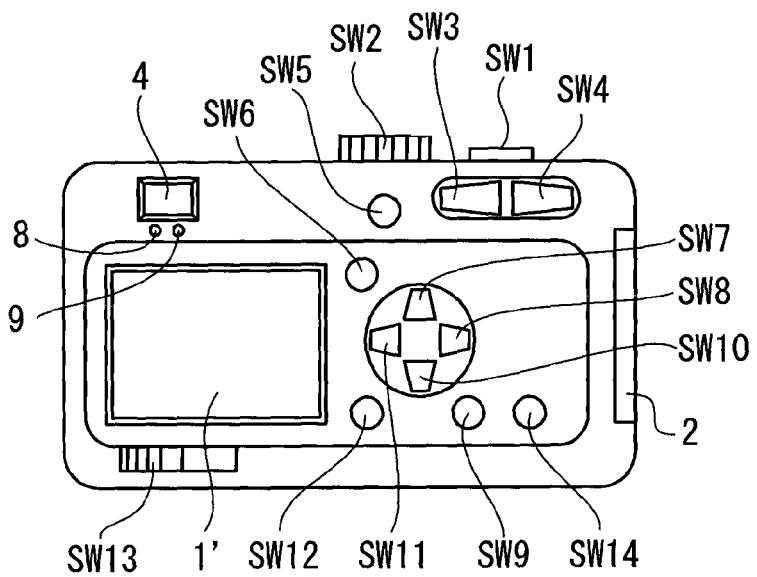

Each of FIGS. 1A to 1C illustrates a digital still camera. On a top surface of a camera body of the digital still camera, a shutter release switch SW1, a mode dial switch SW2, and a sub LCD (Liquid Crystal Display) 1 are arranged.

On a front surface of the camera body, a lens barrel unit 7 including a shooting lens, an optical viewfinder 4, a flash 3, a distance-metering unit 5, and a remote control light receiver 6 are provided.

On a rear surface of the camera body, a power switch SW13, an LCD monitor 1', an AF LED 8, a flash LED 9, a wide-angle zoom switch SW3, a telephoto zoom switch SW4, a self-timer switch SW5 that sets/releases a self-timer, a menu switch SW6, an up movement/flash-setting switch SW7, a right movement switch SW8, a display switch SW9, a down movement/macro switch SW10, a left movement/image conformation switch SW11, an OK switch SW12, and a camera shake correction switch 14 are provided. On a side surface of the camera body, a memory card/battery slot cover 2 is provided.

Since a function and an action of each member of the digital still camera are known, an explanation thereof will be omitted.

Figure 2:
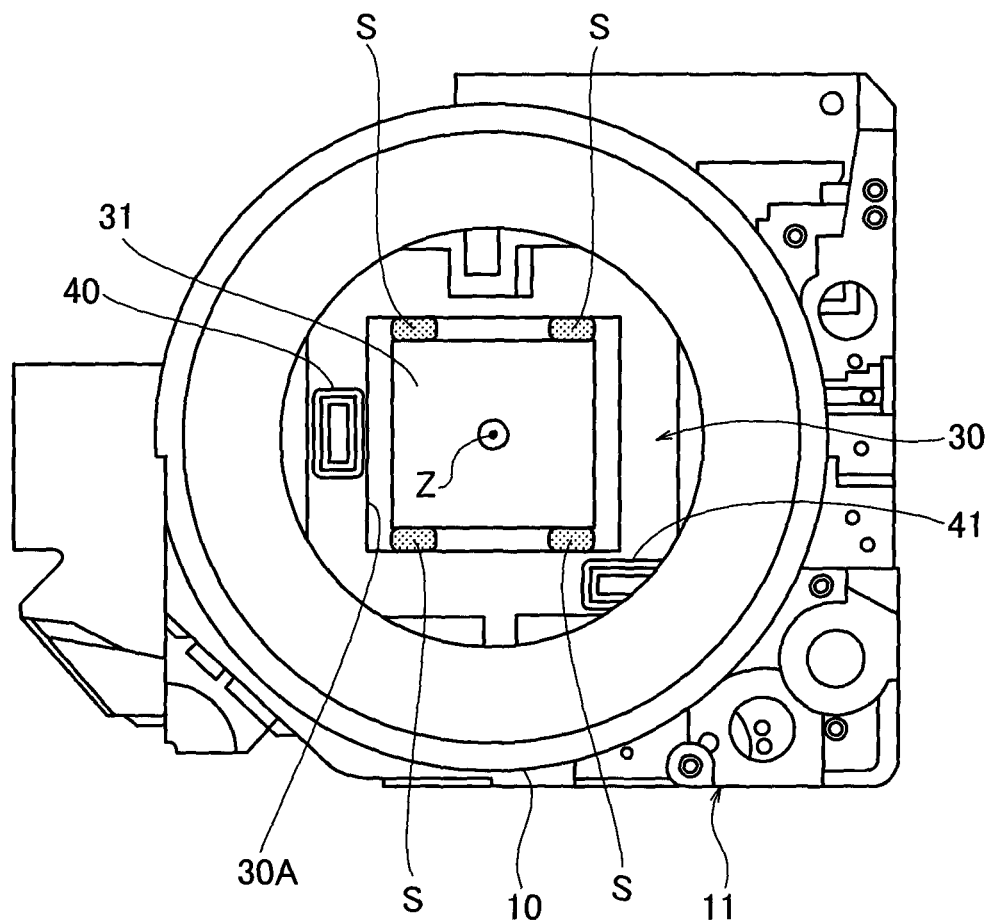
FIG. 2 is a front view illustrating a fixing cylinder of a lens barrel of a digital camera.
Figure 2:
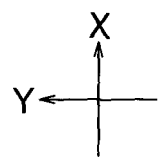

The lens barrel unit 7 illustrated in FIG. 1B has a fixing cylinder 10 illustrated in FIG. 2, a movable cylinder (not-illustrated) that is provided to move forward and backward along an optical axis direction (vertical direction with respect to a plane of paper) in the fixing cylinder 10, a shooting optical system provided in the movable cylinder, and so on. The movable cylinder moves forward and backward by a not-illustrated forward and backward movement mechanism.

Figure 3:
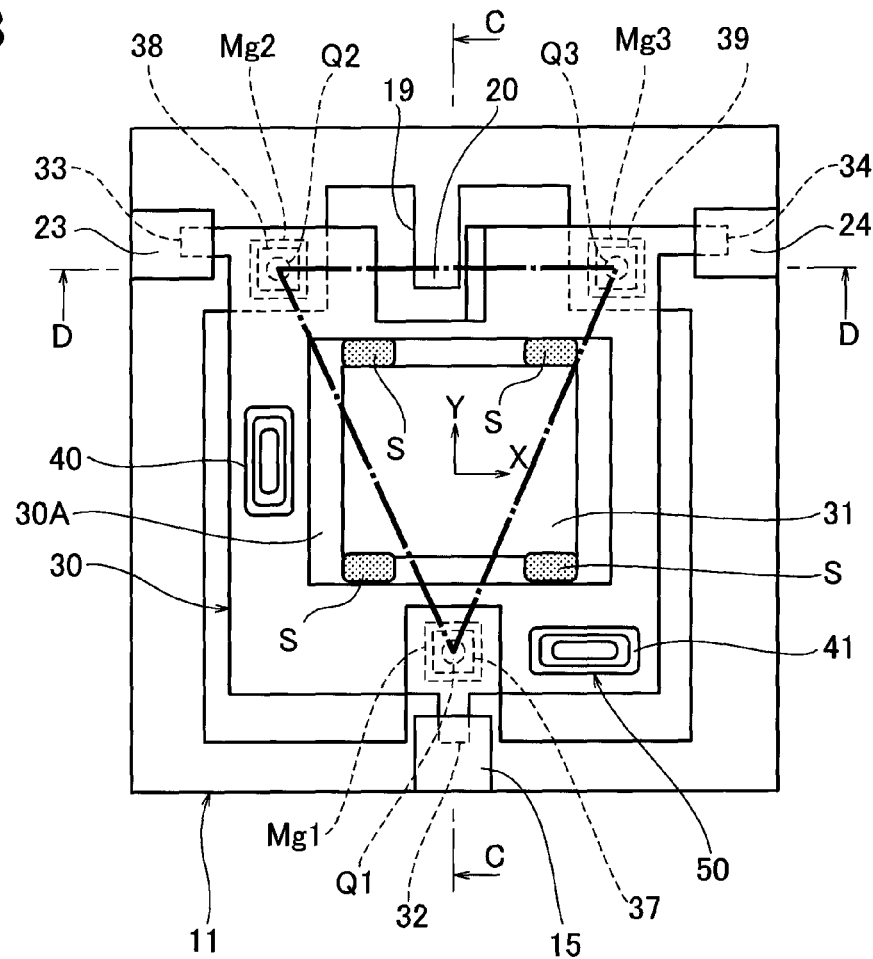
FIG. 3 is a front view illustrating a state where a movable frame is mounted on a base.
Figure 4:
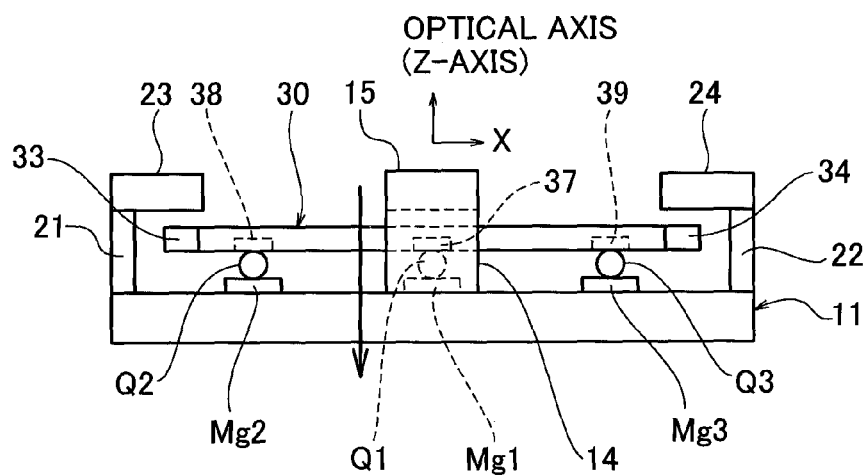
FIG. 4 is a side view illustrating a state where the movable frame is mounted on the base.

The fixing cylinder 10 is fixed to the base 11 mounted in the camera body. In the base 11, as illustrated in FIGS. 3 and 4, a movable frame 30 is mounted to be movable in X- and Y-directions in a plane perpendicular to the optical axis (Z-axis). In the base 11, a circuit board part where electronic components are mounted is integrally formed; however, here, the base 11 where the circuit board part is omitted is schematically illustrated in FIGS. 3 and 4. Hereinafter, the base 11 is also schematically illustrated for convenience of explanation.

In the movable frame 30, an image sensor 31 is fixed with an adhesive agent S. The movable frame 30 is moved in the X- and Y-directions to prevent an image blur due to camera shake.

[Base]

Figure 5:
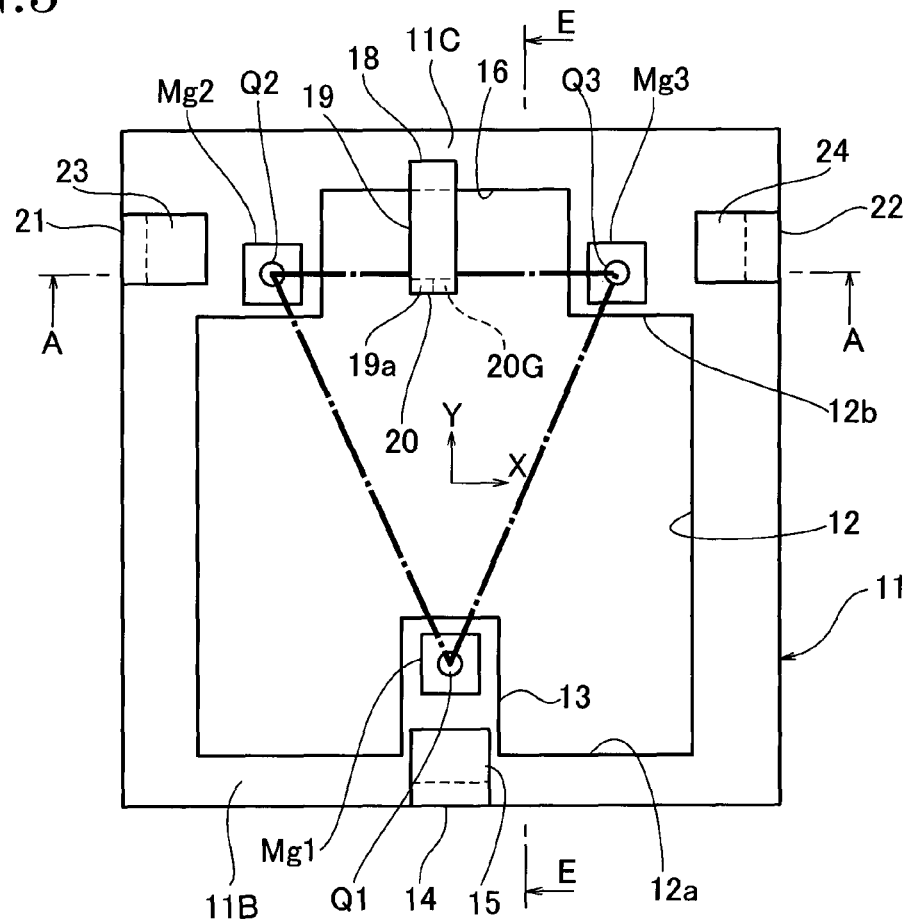
FIG. 5 is a front view of the base.

The base 11, as illustrated in FIG. 5, has an opening 12 in a quadrangular shape. In a lower edge part 12a of the opening 12, a supporting part 13 that protrudes upward (in the Y-direction) is formed, and a magnet plate Mg1 is mounted on the supporting part 13. An iron ball Q1 that is a magnetic spherical body is attracted and held to the magnet plate Mg1 by magnetism.

Figure 6:
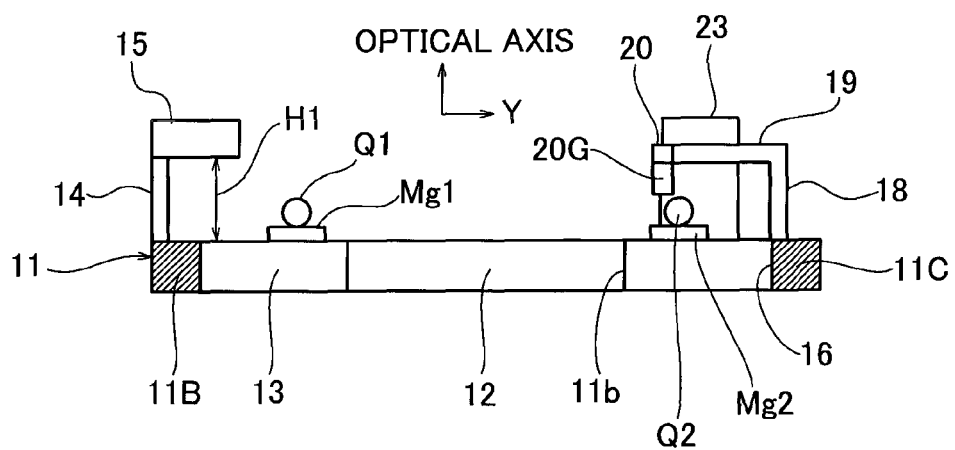
FIG. 6 is a cross-sectional view of FIG. 5 along a line E-E.

In a lower part 11B of the base 11, as illustrated in FIG. 6, a projection 14 that projects in the optical axis direction is formed. In a tip of the projection 14, a regulating member 15 as a regulating part that extends in the Y-direction is provided.

A distance between the regulating member 15 and the base 11 is set to a predetermined distance H1.

Figure 7:
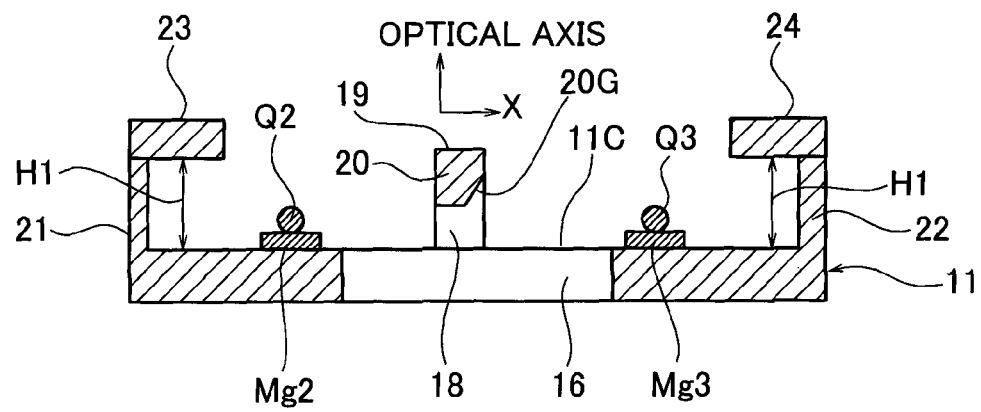
FIG. 7 is a cross-sectional view of FIG. 5 along a line A-A.

In an upper edge part 12b of the opening 12 of the base 11, a concave part 16 (see FIG. 5) is formed. In an upper part 11c of the base 11, as illustrated in FIGS. 6 and 7, a projection 18 that projects in the optical axis direction is formed, and in an upper part of the projection 18, an arm part 19 that extends below (in FIG. 5) is formed. In a tip part of the arm part 19, as illustrated in FIG. 7, a guide part 20, a cross-section of which is rectangular, is formed, and in a right-side surface (in FIG. 7) of the guide part 20, a guide inclined surface (tapered surface: contacting part) 20G as a guide device is formed to face the concave part 16.

Additionally, on both sides of the concave part 16 of the base 11, as illustrated in FIG. 5, magnet plates Mg2, Mg3 are mounted to sandwich the concave part 16 therebetween, and iron balls Q2, Q3 that are magnetic sphere bodies are attracted and held to the magnet plates Mg2, Mg3 by magnetism. The lengths of the arm part 19 and so on are set such that the guide part 20 is in an isosceles triangle formed by lines (chain lines in FIG. 5) connected to those three iron balls Q1, Q2, Q3.

On both sides of the upper part 11C of the base 11 (outer sides of the magnet plates Mg2, Mg3), as illustrated in FIG. 7, projections 21, 22 that project in the optical axis direction are formed, and in the upper parts of the projections 21, 22, regulating members 23, 24 as regulating parts that extend inward are provided. A distance between each of the regulating members 23, 24 and the base 11 is set to a predetermined distance H1.

[Movable Frame]

Figure 8:
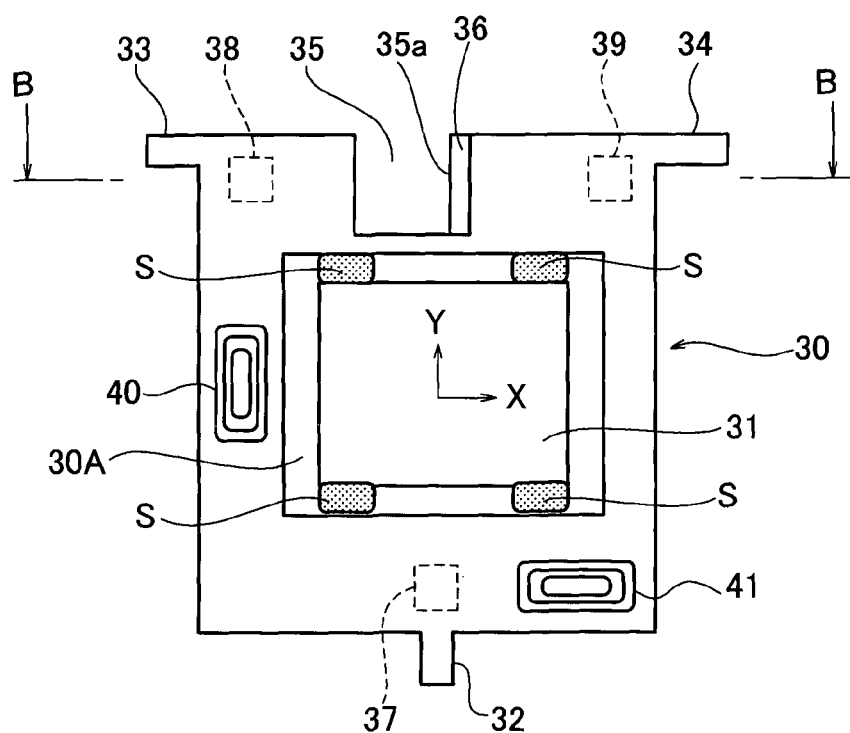
FIG. 8 is a front view illustrating the movable frame.
Figure 9:
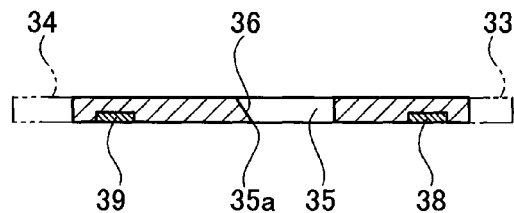
FIG. 9 is a cross-sectional view of the movable frame illustrated in FIG. 8 along a line B-B.

The movable frame 30, as illustrated in FIG. 8, is a rectangular plate-like frame body having an opening 30A on which the image sensor 31 is mounted. In a lower part (in FIG. 8) of the movable frame 30, a projection 32 that projects downward is formed, and in both side parts of an upper part of the movable plate 30, projections 33, 34 that project laterally are formed, respectively. At a position closer to the left side (in FIG. 8) in the upper part of the movable frame 30, a concave part 35 is formed, and in an edge part 35a on a right side (in FIG. 8) of the concave part 35, as illustrated in FIG. 9, an inclined surface (tapered surface: contacting part) 36 as a guide device is formed entirely to face obliquely upward.

The length of the edge part 35a, that is, the depth of the concave part 35 is set to be longer than a movable distance of the movable frame 30.

On a reverse surface of the lower part of the movable frame 30, an iron plate 37 that is a metal plate having magnetism is mounted at a position above the projection 32 (in FIG. 8). On a reverse surface of the upper part of the movable frame 30, as illustrated in FIG. 9, iron plates 38, 39 that are metal plates having magnetism are mounted.

On a front surface on the left side of the movable frame 30, a coil 40 for moving the movable frame 30 in the X-direction is provided. On a front surface of the lower part of the movable frame 30, a coil 41 for moving the movable frame 30 in the Y-direction is provided.

As illustrated in FIGS. 3 and 4, the iron plates 37 to 39 of the movable frame 30 are provided at positions facing the magnet plates Mg1 to Mg3 of the base 11, respectively, and the projections 32 to 34 of the movable frame 30 are provided at positions facing the regulating members 15, 23, 24 of the base 11, respectively.

[Holding Movable Frame]

Figure 10:
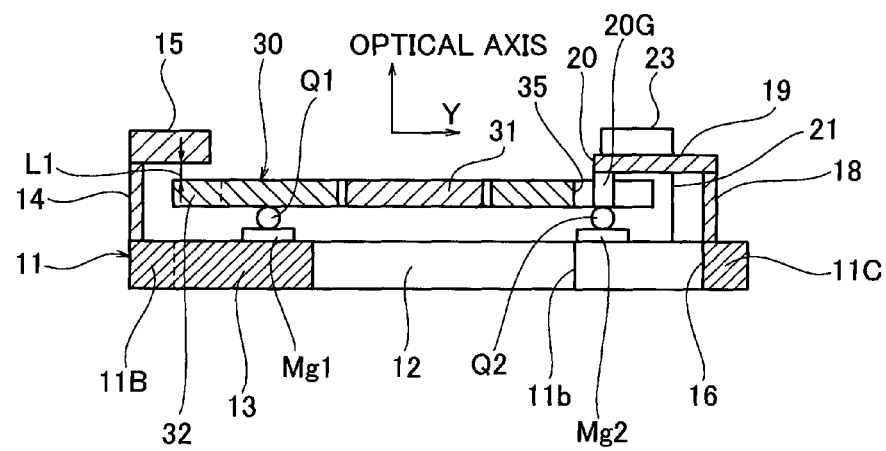
FIG. 10 is a cross-sectional view of FIG. 3 along a line C-C.

As illustrated in FIGS. 3, 4, and 10, the projections 32 to 34 of the movable frame 30 are arranged below the regulating members 15, 23, 24 of the base 11 (in FIG. 4), respectively, and the iron plates 37 to 39 of the movable frame 30 are attracted to the magnet plates Mg1 to Mg3 via the iron balls Q1 to Q3, respectively, and the movable plate 30 is in a state of being attracted and held to the base 11. The iron plates 37 to 39, the iron balls Q1 to Q3, and the magnet plates Mg1 to Mg3 constitute three attracting and holding devices.

The movable frame 30 is movable in the X- and Y-directions in a state of being held to the base 11 via the iron balls Q1 to Q3.

Note that the magnet plates Mg1 to Mg3 of the base 11 can be provided in the movable frame 30. In this case, the iron plates 37 to 39 of the movable frame 30 can be provided in the base 11.

Figure 11:
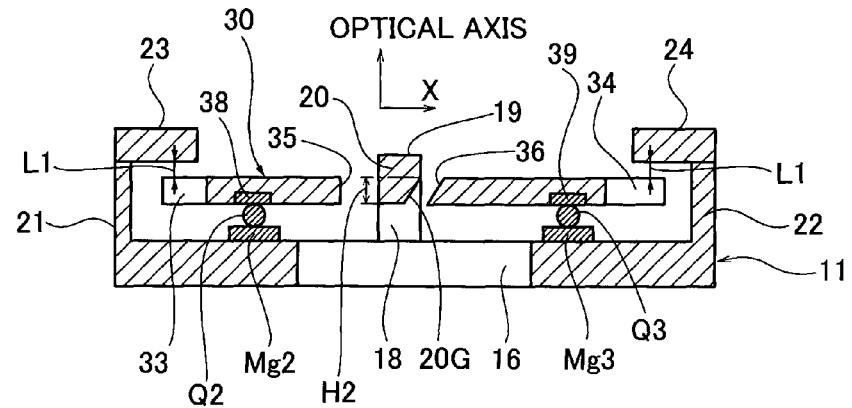
FIG. 11 is a cross-sectional view of FIG. 3 along a line D-D.

Incidentally, as illustrated in FIG. 11, separate distances between the projection 33 of the movable frame 30 and the regulating members 23, and between the projection 34 of the movable frame 30 and the regulating members 24 are set to a separate distance L1 each, and similarly, as illustrated in FIG. 10, a separate distance between the projection 32 of the movable frame 30 and the regulating member 15 is also set to the separate distance L1. The separate distance L1 is set to be smaller than a height H2 of the guide inclined surface 20G of the base 11. And, the predetermined distance H1=the thickness of a magnet plate Mg+a diameter of an iron ball Q+the thickness of the movable frame 30+the separate distance L1, and the separate distance L1 is set to be smaller than the thickness of the movable frame 30.

[Correction Mechanism]

The movement in the X- and Y-directions of the movable frame 30 is performed by flowing electric current to the coils 40, 41. This is performed by providing two X magnets (not illustrated) and two Y magnets (not illustrated) so as to sandwich the coils 40, 41, respectively. One of the two X magnets and one of the two Y magnets are provided in a yoke (not illustrated) provided in the base 11, and the other one of the two X magnets and the other one of the two Y magnets are provided on a side of the fixing cylinder 10. The coil 40 and the two X magnets constitute a device for moving in the X-direction, and the coil 41 and the two Y magnets constitute a device for moving in the Y-direction.

In order to detect positions of the movable frame 30 in the X- and Y-directions, magnets for detecting X and Y positions (not illustrated) are firmly fixed to the yoke, and X and Y magnetic sensors (not illustrated) that detect the magnets for detecting X and Y positions are provided in the movable frame 30.

Additionally, a gyro sensor (not illustrated) is provided on a side of the camera body. Based on an output of the gyro sensor, an arithmetic and control unit (not illustrated) calculates a target position of the image sensor 31, flows electric current to the coils 40, 41 to eliminate a difference between the target position and an actual origin position of the image sensor 31, and moves the movable frame 31 in the X- and Y-directions, thereby making it possible to prevent an image blur due to camera shake.

The movable frame 30, the attracting and holding devices, the coils 40, 41, the two X magnets and the two Y magnets, the magnets for detecting X and Y positions, the X and Y magnetic sensors, the arithmetic and control unit, and so on constitute a correction mechanism 50 that prevents an image blur due to camera shake. The constitution and movement of the correction mechanism 50 are disclosed in detail in Japanese Patent Application Publication numbers 2007-114486 and 2010-231168, and accordingly, a detailed explanation will be omitted.

The base 11, the image sensor 31, and the correction mechanism 50 constitute the imaging apparatus.

[Movement]

Next, movement of the imaging apparatus as constituted above will be explained.

Figure 12:
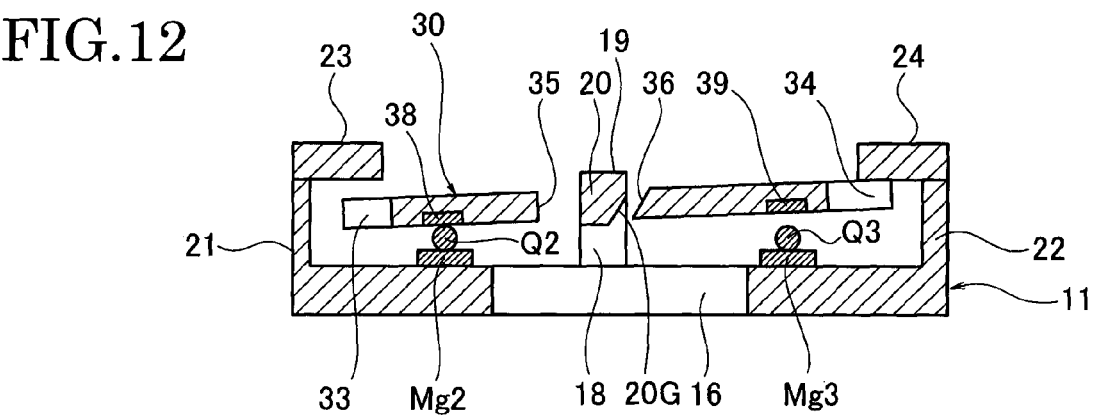
FIG. 12 is an explanatory diagram illustrating a moving state of the movable frame when receiving an impact.

As illustrated in FIGS. 4 and 11, when the movable frame 30 is attracted and held to the base 11 by the magnet plates Mg1 to Mg3, in a case where equal to or more than a predetermined impact is applied to the imaging apparatus, and as illustrated in FIG. 12, the projection 34 of the movable frame 30 is in a state of contacting the regulating member 24 of the base 11, electric current is flowed to the coil 40 of the movable frame 30, and the movable frame 30 is moved to the left (in FIG. 12).

Figure 13:
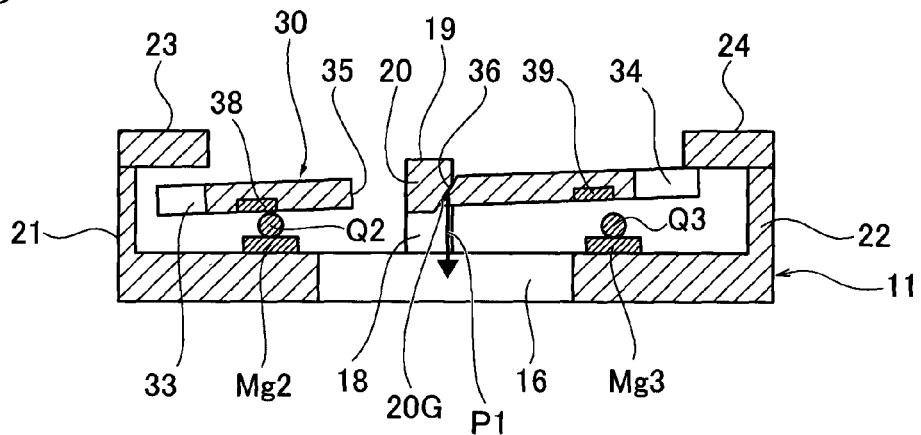
FIG. 13 is an explanatory diagram illustrating a state when moving the movable frame.

By movement of the movable frame 30 to the left, as illustrated in FIG. 13, the inclined surface 36 of the movable frame 30 contacts the guide inclined surface 20G of the guide part 20 of the base 11. When the movable frame 30 further moves to the left, the inclined surface 36 of the movable frame 30 is guided by the guide inclined surface 20G of the base 11, a force in a direction illustrated by an arrow P1 (P1 direction) acts on the movable frame 30, and the movable frame 30 turns about the iron ball Q2 as a fulcrum in a clockwise direction. And as illustrated in FIG. 14, the movable frame 30 is attracted and held to the base 11 by the magnet plates Mg1 to Mg3.

Figure 15:
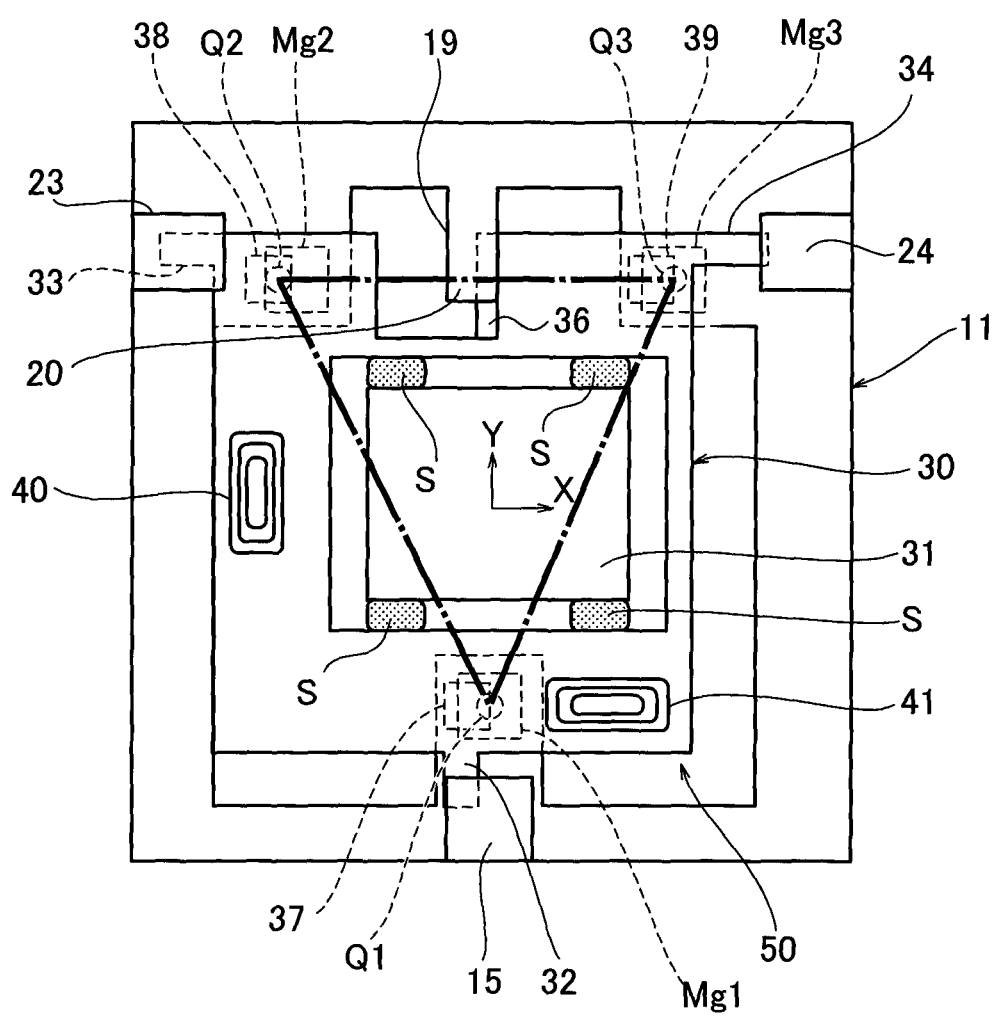
FIG. 15 is an explanatory diagram illustrating a positional relationship between the base illustrated in FIG. 13 and the movable frame.

In this case, as illustrated in FIG. 15, since the guide part 20 of the base 11 is in a triangle formed by the chained lines connected to the three iron balls Q1, Q2, Q3, the guide part 20 pushes three points (positions of the iron balls Q1 to Q3) of the movable frame 30 in the P1 direction. Therefore, the movable frame 30 is reliably attracted and held to the base 11 by the magnet plates Mg1 to Mg3.

Figure 14:
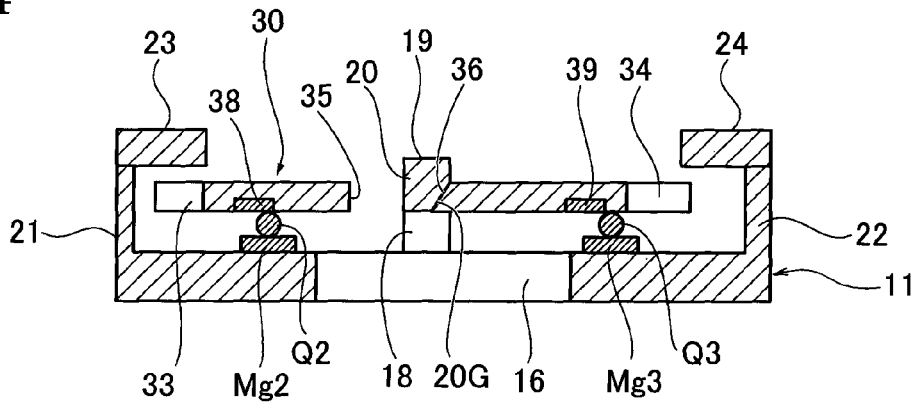
FIG. 14 is an explanatory diagram illustrating a state where the movable frame is attracted and held to the base.

When the movable frame 30 moves until a position illustrated in FIG. 14, the movable frame 30 is not able to move to the left any further. A distance in the X-direction between an origin position of the movable frame 30 illustrated in FIG. 14 and the optical axis is set to be larger than an amount of a maximum image blur in the X-direction due to the camera shake.

Additionally, there is a possibility that an origin position (center position) of the image sensor 31 of the movable frame 30 is shifted in the Y-direction from the optical axis. Therefore, for example, the movable frame 30 is moved to a position in the Y-direction where the movable frame 30 can move. That is, the movable frame 30 is moved until the projection 32 of the movable frame 30 contacts the projection 14 (see FIG. 10) of the base 11.

That is, a position where the projection 32 of the movable frame 30 contacts the projection 14 of the base 11 is taken as a reference position in the Y-direction of the movable frame 30, and a position of the movable frame 30 illustrated in FIG. 14 is taken as a reference position in the X-direction of the movable frame 30. Since those reference positions can be set beforehand, from those reference positions, by moving the movable frame 30 by a predetermined distance to the light (in FIG. 14: X-direction) and moving the movable frame 30 by a predetermined distance upward (in FIG. 3 Y-direction), it is therefore possible to correspond the origin position of the image sensor 31 to the optical axis. After this conformity, the camera shake correction is performed by the correction mechanism 50.

Figure 16:
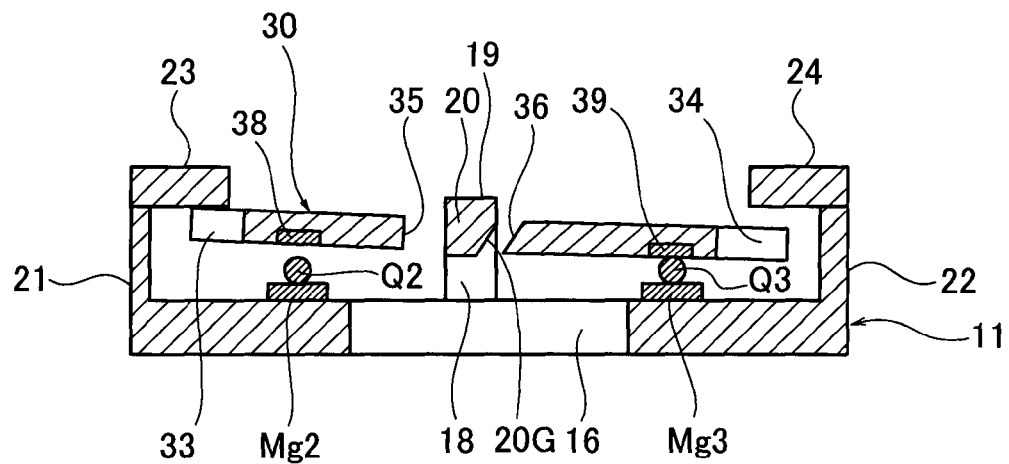
FIG. 16 is an explanatory diagram illustrating another moving state of the movable frame when receiving an impact.
Figure 17:
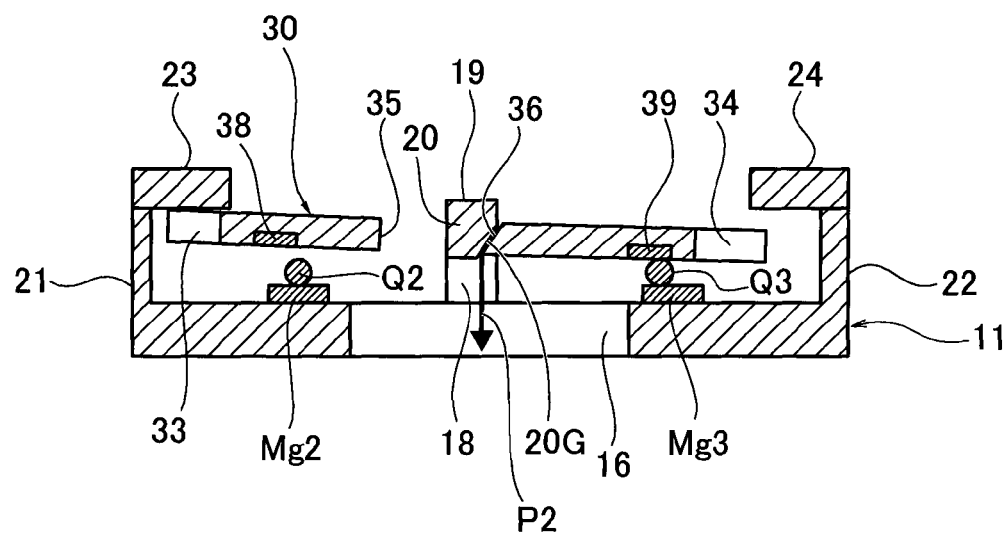
FIG. 17 is an explanatory diagram illustrating a state when moving the movable frame illustrated in FIG. 16.

When a state of the movable frame 30 becomes a state where the projection 33 of the movable frame 30 contacts the regulating member 23 of the base 11 as illustrated in FIG. 16 from a state illustrated in FIGS. 4 and 11 due to an impact, as described above, the movable frame 30 is moved to the left (in FIG. 12) by flowing electric current to the coil 40 of the movable frame 30. Thus, as illustrated in FIG. 17, the inclined surface 36 of the movable frame 30 contacts the guide inclined surface 20G of the guide part 20 of the base 11 as described above. And when the movable frame 30 further moves to the left, a force in a direction illustrated by an arrow P2 acts on the movable frame 30, and the movable frame 30 turns about the iron ball Q3 as a fulcrum in an anti-clockwise direction. And as illustrated in FIG. 14, the movable frame 30 is attracted and held to the base 11 by the magnet plates Mg1 to Mg3.

In order to correspond the origin position of the image sensor 31 to the optical axis, the same as described above is performed, and therefore explanation thereof will be omitted.

Thus, the movable frame 30 is attracted and held to the base 11 by flowing the electric current to the coil 40 of the correction mechanism 50 that performs the image blur correction. Therefore, none of the locking lever for the center position correction, the motor, and the like need to be provided as in a conventional way, and it is possible to miniaturize an imaging apparatus.

The movement of the movable frame 30 to the left is performed such that the arithmetic and control unit flows the electric current to the coil 40, for example, when a separate distance reset button (not illustrated) provided on the rear surface of the camera body is pressed; however it can be performed each time the imaging apparatus starts.

[Second Embodiment]

Figure 18:
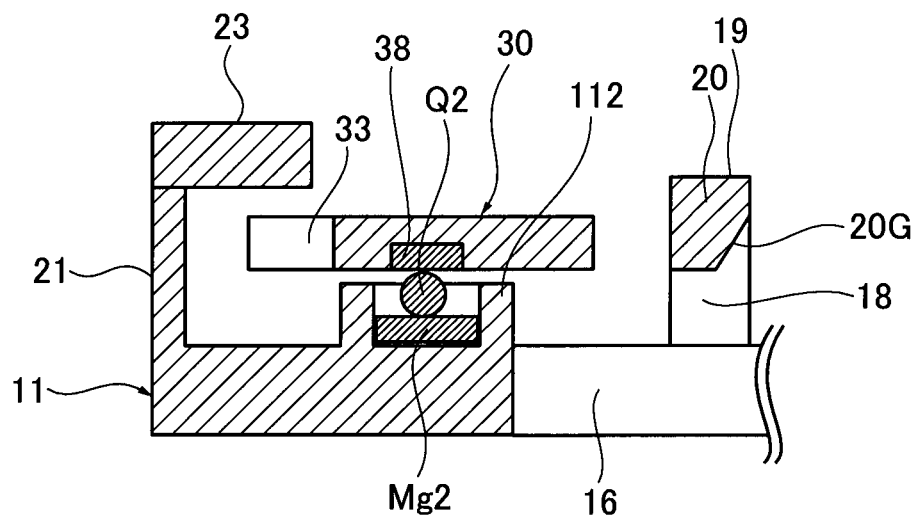
FIG. 18 is an explanatory diagram partially illustrating a constitution of a second embodiment.

FIG. 18 partially illustrates a constitution of the base 11 of the second embodiment. In the second embodiment, as illustrated in FIG. 18, a surrounding wall 112 of a predetermined height is provided around the magnet plate Mg2 of the base 11, and similarly, surrounding walls of the predetermined height are also provided around the magnet plates Mg1, and Mg3 (not illustrated).

Figure 19:
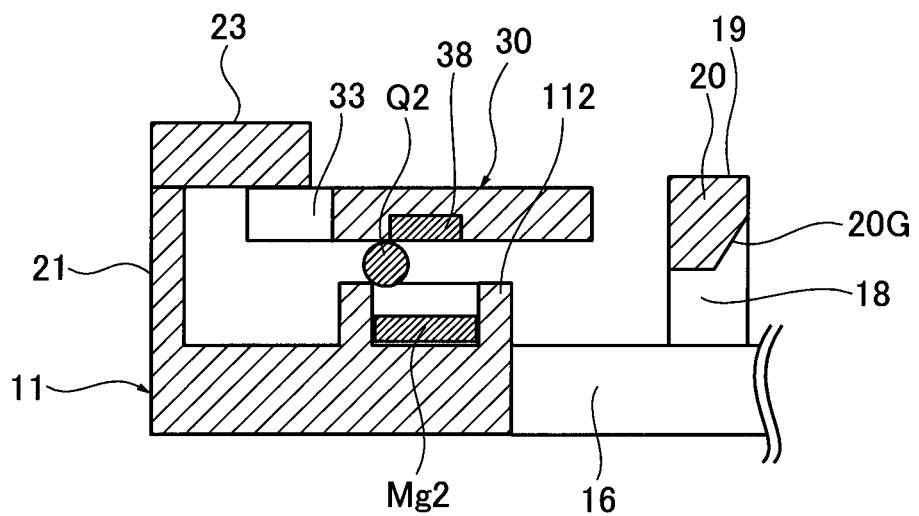
FIG. 19 is an explanatory diagram illustrating that an iron ball is not dislodged from a wall due to an impact.

Therefore, even if equal to or more than a predetermined impact is applied to the imaging apparatus, as illustrated in FIG. 19, the iron ball Q2 is not dislodged from the surrounding wall 112, and neither do the iron balls Q1 and Q3 (not illustrated).

If the iron balls Q1 to Q3 temporarily separate from the magnet plates Mg1 to Mg3, they are not dislodged from the surrounding walls 112, and are immediately attracted to the magnet plates Mg1 to Mg3. That is, the iron balls Q1 to Q3 remain in the magnet plates Mg1 to Mg3 despite an impact.

Figure 20:
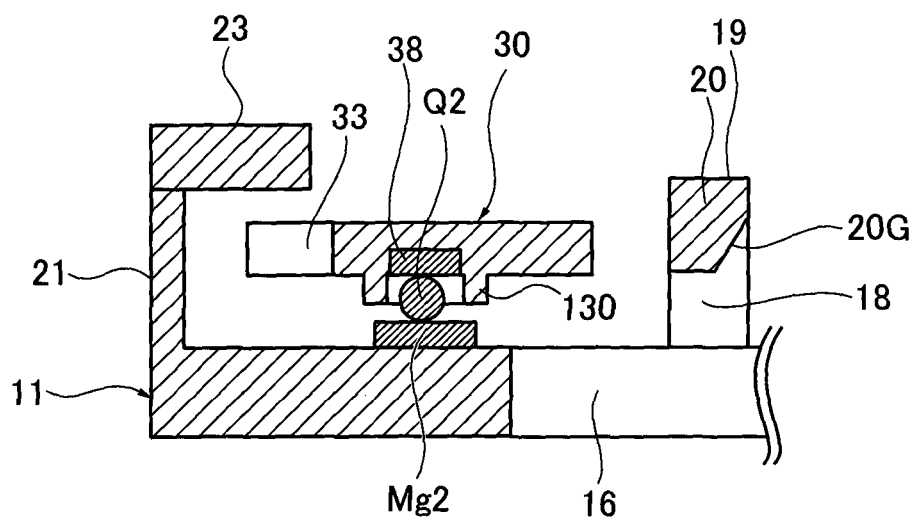
FIG. 20 is an explanatory diagram partially illustrating another example of the second embodiment.

FIG. 20 partially illustrates another example of the second embodiment. In this example, as illustrated in FIG. 20, a surrounding wall 130 of a predetermined height is provided around the iron plate 38 of the movable frame 30, and thereby the iron ball Q2 remains in the magnet plate Mg2. Similarly, surrounding walls of the predetermined height are provided around the iron plates 37, and 39, and thereby the iron balls Q1, and Q3 remain in the magnet plates Mg1, and Mg3 (not illustrated).

In each of the above embodiments, the guide inclined surface 20G, and the inclined surface 36 are provided in the guide part 20 of the base 11, and the movable frame 30, respectively. However, an inclined surface may be provided in one of them. In this case, the other that contacts the guide inclined surface 20 or the inclined surface 36 is the contacting part.

In each of the above embodiments, the movable frame 30 that leaves the base 11 is moved in the X-direction to be attracted and held to the base 11; however, the movable frame 30 may be moved in the Y-direction to be attracted and held to the base 11.

According to the embodiments of the present invention, it is possible to attract and hold the movable frame that is separated from the magnetic spherical body to the base without providing the locking lever for the center position correction or the motor.

INDUSTRIAL APPLICABILITY

In the above embodiments, the imaging apparatus is mounted in a digital still camera; however, it is not limited thereto, and may be mounted in a mobile phone, or other electronic devices, for example.

Although the present invention has been described in terms of exemplary embodiments, it is not limited hereto. It should be appreciated that variations may be made in the embodiments described by persons skilled in the art without departing from the scope of the present invention as defined by the following claims.

CROSS-REFERENCE TO RELATED APPLICATIONS

The present application is based on and claims priority from Japanese Patent Application number 2011-186945, filed Aug. 30, 2011, the disclosure of which is hereby incorporated by reference herein its entirety.

The invention claimed is:

1. An imaging apparatus comprising:
a base that is provided in a body case in which a shooting optical system is mounted;
an image sensor that receives an image of a photographic subject formed by the shooting optical system; and
a correction mechanism that prevents an image blur due to movement of the image of the photographic subject by following the image sensor in an X-Y plane perpendicular to an optical axis of the shooting optical system taken as a Z-axis, in accordance with the movement of the image of the photographic subject on the image sensor due to camera shake occurring in the camera body;
the correction mechanism having:
a movable frame that holds the image sensor on a first side of the movable frame, the movable frame being arranged on a front side of the base;
three attracting and holding devices that attract and hold the movable frame movably in the X-Y plane, and are arranged at three positions so as to form a triangle;
a device for moving in an X-direction that moves the movable frame in the X-direction; and
a device for moving in a Y-direction that moves the movable frame in the Y-direction,
each of the three attracting and holding devices having:
a metal plate having magnetism that is provided in one of the base and a second side of the movable frame, the second side of the movable frame being opposite from the first side of the movable frame;
a magnet plate that is provided in the other of the base and the second side of the movable frame; and
a magnetic spherical body that is provided between the metal plate having magnetism and the magnet plate such that the magnetic spherical body is under the second side of the movable frame;
the attracting and holding device attracting and holding the movable frame to the base by attracting the metal plate having magnetism to the magnet plate via the magnetic spherical body,
wherein a guide device, in a case where at least one metal plate having magnetism of the three attracting and holding devices separates from the magnetic spherical body, when the movable frame is moved in a predetermined direction by one of the devices for moving in the X- and Y-directions, that moves the movable frame to a side of the base along with the movement of the movable frame, and thereby the metal plate having magnetism separated from the magnetic spherical body is attracted to the magnetic spherical body is provided in the triangle.

2. The imaging apparatus according to claim 1, wherein the guide device includes a tapered surface formed on one of the base and the movable frame, and a contacting part that contacts the tapered surface and is provided on the other one of the base and the movable frame, and the guide device moves the movable frame to the side of the base by a contact of the contacting part with the tapered surface by the movement of the movable frame.

3. The imaging apparatus according to claim 2, wherein on the contacting part a tapered surface is formed.

4. The imaging apparatus according to claim 1, wherein a regulating part that regulates the movable frame so as not to separate from the base in a Z-axis direction by equal to or more than a predetermined distance is provided.

5. The imaging apparatus according to claim 1, wherein a surrounding wall that prevents the magnetic spherical body from leaving the magnet plate is provided on the movable frame or the base.

6. The imaging apparatus according to claim 1, wherein the movable frame is moved in the predetermined direction immediately after starting the imaging apparatus.

7. An electronic device comprising:
an imaging apparatus according to claim 1.

8. The imaging apparatus according to claim 1, wherein an upper part of the base includes a concave part, and two of the attracting and holding devices sandwich the concave part therebetween.

9. The imaging apparatus according to claim 1, wherein the triangle is an isosceles triangle.

* * * * *